United States Patent Office 3,719,762
Patented Mar. 6, 1973

3,719,762
USE OF ACETOACETYLAMINO DIPHENYL AMINES AS ANTIINFLAMMATORY AGENTS
Kurt Thiele, Frankfurt, Germany, assignor to Deutsche Gold- und Silber-Scheideanstalt vormals Roessler, Frankfurt am Main, Germany
No Drawing. Continuation-in-part of applications Ser. No. 682,616, Nov. 13, 1967, and Ser. No. 840,816, July 10, 1969. This application Aug. 25, 1970, Ser. No. 66,883
Claims priority, application Germany, Nov. 16, 1966, D 51,561; Sept. 1, 1967, D 53,982
Int. Cl. A61k 27/00
U.S. Cl. 424—324    15 Claims

ABSTRACT OF THE DISCLOSURE

N-aromatic substituted acid amide compounds of the formula

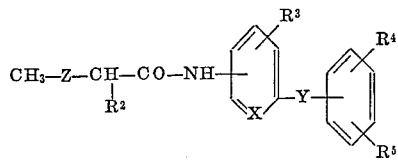

wherein:

$$Z \text{ is } -\underset{\underset{O}{\|}}{C}-,\quad -\underset{\underset{OH}{|}}{CH}-\text{ or } -\underset{\underset{O\text{-acyl}}{|}}{CH}-$$

wherein
the acyl is the acyl group of a lower aliphatic, preferably, alkyl carboxylic acid or of a monoaliphatic, preferably, alkyl ester of carbonic acid,
$R^2$ is H or lower alkyl,
$R^3$ is H, halogen, lower alkyl or lower alkoxy, each of $R^4$ and $R^5$ taken individually is hydrogen, halogen, lower alkyl, nitro, trifluoromethyl, lower alkoxy, lower alkyl amino, amino, hydroxy, acyl-oxy as defined above or acyl-amino as defined above,
X is =N— or =CH— and
Y is —CH₂— or —NH—
and wherein when Z is

X is CH and Y is NH at least one of $R^2$, $R^3$, $R^4$ and $R^5$ is other than hydrogen.

Such compounds have valuable pharmaceutical properties, such as, antiinflammatory, analgesic, antipyretic and/or antispasmodic properties.

The present application is a continuation-in-part of application Ser. No. 682,616, filed Nov. 13, 1967, now Pat. No. 3,474,107, Oct. 21, 1969, and application Ser. No. 840,816, filed July 10, 1969, and now Pat. No. 3,567,765.

The compounds useful in the invention have been described above and can be prepared by conventional methods, for instance, by reacting a compound of the formula

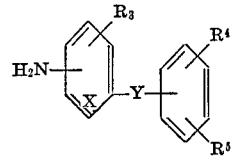

with an acid of the formula

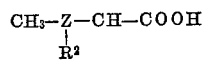

or its corresponding halide, ester, amide, anhydride or ketene.

The present application is particularly concerned with the pharmaceutical use of compounds having the formula

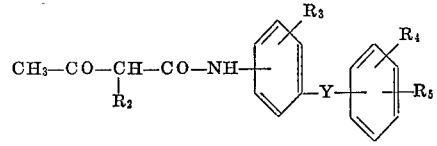

wherein $R_2$ is hydrogen or lower alkyl, $R_3$ is hydrogen, halogen, lower alkyl or lower alkoxy, each of $R_4$ and $R_5$ is hydrogen, halogen, lower alkyl, nitro, trifluoromethyl, lower alkoxy, lower alkylamino, amino, hydroxy, lower acyloxy and lower acylamino and Y is —CH₂ or NH with the proviso that when Y is NH at least one of $R_2$, $R_3$, $R_4$ and $R_5$ is other than hydrogen.

The compounds according to the invention when they contain basic centers can be converted to their pharmaceutically acceptable acid addition salts. Also, in the event they are racemates they can be resolved into the optically active isomeric components. Optically active starting materials also can be employed right from the start.

The compounds according to the invention, as already indicated, possess valuable pharmaceutical properties, among which are analgesic, antipyretic, antispasmodic and especially antiinflammatory properties although in some instances compounds may exhibit some of such properties to a greater extent than the others and in some instances, for instance, some of such properties may be lacking.

The dosages in general, for example, can be between about 1 and 300 mg./kg. oral. The compounds are well tolerated, for example, their acute toxicity with mice expressed as LD₅₀ in mg./kg. is between 700 and 4000 mg./kg.

The compounds according to the invention can, for example, be divided into the following groups based on chemical constitution and activity.

(A) Diphenyl methane and pyridyl phenyl methane derivatives (compounds of Formula I wherein Y=CH₂). This group of compounds has an especially good antiinflammatory action and a weaker analgesic action.

| Compound of Example No. | Antiinflammatory action in percent | Analgesic action |
|---|---|---|
| 5 | 67 | Present. |
| 6 | 66 | Do. |

(B) Aceto acetyl amino-diphenyl amine derivatives (compounds of Formula I wherein Y=NH, X=CH and

These compounds also have antiinflammatory action but no analgesic action).

| Compound of Example No. | Antiinflammatory action in percent | Analgesic action |
|---|---|---|
| 4 | 46 | None. |
| 8 | 31 | Do. |

(C) Hydroxy butyramino-diphenyl amine derivatives (compounds of Formula I wherein Y=NH, X=CH and

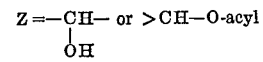

which possess a strong antiinflammatory action and in addition a good analgesic action and in some instances antipyretic and antispasmodic action).

Compound of Example No. 3
Antiinflammatory action in percent 94
Analgesic action $ED_{50}$ in mg./kg. oral 71–85
Antipyretic action $ED_{50}$ in mg./kg. 17
Antispasmodic action in percent with dosage 32

(D) Acetoacetyl-phenyl amino pyridine derivatives (compounds of Formula I wherein Y=NH, X= =N—, and $$Z = -\underset{\underset{O}{\|}}{C}-$$

These compounds have pharmaceutical activities similar to those of group A, namely, a good antiinflammatory action but weaker or no analgesic action).

| Compound of Example No. | Antiinflammatory action in percent | Analgesic activity |
| --- | --- | --- |
| 1 | 62 | Present. |
| 7 | 27 | None. |
| 9 | 82 | Do. |
| 10 | 80 | Present. |
| 10a | 81 | Do. |
| 10b | 34 | None. |
| 10c | 87 | Do. |
| 13 | 35 | Do. |

(E) Hydroxy butryamino - phenylamino - pyridine derivatives (compounds of Formula I wherein Y=NH, X= =N—, and $$Z = -\underset{\underset{OH}{|}}{CH}- \text{ or } >CH-O\text{-acyl}$$

The activity of these compounds is similar to that of the compounds of group A and of Group D). Analgesic activity has only been found present in one of such compounds and in this instance it is very strong.

| Compound of Example No. | Antiinflammatory action in percent | Analgesic action |
| --- | --- | --- |
| 2 | 82 | None. |
| 14 | 51 | Very strong. |
| 15 | 43 | None. |
| 16 | 92 | Do. |
| 17 | 87 | Do. |

The antiinflammatory action was ascertained by the method according to Domenjoz et al., Arch. exp. Pharm. Path. 230, 325, 1957, at a 300 mg./kg. oral dosage and the antiinflammatory action expressed in percent of reduction of edema in ovalbumen edema of the rat paw as against untreated controls. The antiinflammatory action is of the same type as the action of the known antiinflammatory agent phenyl butazone.

The analgesic action was ascertained by the mouse tail test according to Haffner, Deutsche Med. Wochenschrift 55, 731, 1929, with oral dosages of 1 to 500 mg./kg.

The anti-pyretic action was ascertained by yeast fever in rats (O. Büch, Arch. intern. Pharmacodyn, 123, 140, 1959).

The antispasmodic action was ascertained by tests on whole animals (rats) by measurement of the reduction in intestinal motility by measurement of the degree to which the passage of the test meal through the small intestine was slackened.

The application of the compounds according to the invention can be oral, perlingual, parenteral or in the form of an aerosol.

The following examples will serve to illustrate the novel compounds according to the invention.

EXAMPLE 1

2-phenylamino-5-aceto acetyl amino-pyridine

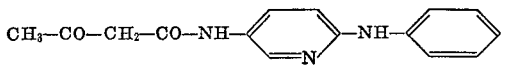

(a) 6.8 g. (0.081 mol) of diketene were added portionwise at 20° C. to a solution of 15 g. (0.081 mol) of 2-phenyl-amino-5-amino-pyridine in 100 ml. of dioxane. After the addition was completed, the mixture was stirred for a further 30 minutes. The crystallized product which already started to precipitate out during the addition of the diketene was filtered off and recrystallized from isopropanol petroleum ether. The melting point was 153–154° C. and the yield 11 g.

(b) A suspension of 18.5 g. (0.1 mol) of 2-anilino-5-amino-pyridine in 100 ml. of xylene, to which 3 drops of pyridine had been added, was added in the course of 1½ to 2 hours at 135–140° C. to a mixture of 15.6 g. (0.12 mol) of freshly distilled aceto acetic ester, 100 ml. of p-xylene and 3 drops of pyridine in a 500 ml. 4-necked flask provided with a stirrer, dropping funnel, descending fractionating column and thermometer. About the same quantity of liquid should be distilled off at the descending condenser as is delivered from the suspension. The mixture was then heated under reflux for a further 2 hours. The product crystallized out upon cooling. Petroleum ether was added and the crystals filtered off and recrystallized twice from isopropanol/petroleum ether. Its melting point was 152–153° C. and the yield 12.5 g.

EXAMPLE 2

2-phenylamino-5-(3-hydroxy-butyramino)-pyridine

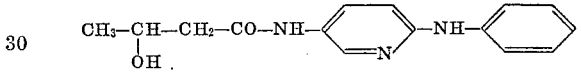

20 g. (0.0745 mol) of 2-phenylamino-5-aceto acetyl amino-pyridine were dissolved in a mixture of 120 ml. of dioxane and 400 ml. of methanol. Then 2.8 g. of sodium borohydride was added portionwise to such solution at about 5–10° C. while stirring. After completion of the addition the cooling bath was removed so that the temperature of the mixture raised to room temperature. Thereafter it was heated a short time to 50° C. and the solution concentrated under vacuum. Water was added to the solid residue and the mixture thoroughly triturated, filtered, washed several times with water, dried and recrystallized from isopropanol/petroleum ether. The product was obtained in a yield of 16 g. with a melting point of 161–162° C.

EXAMPLE 3

4-(3-hydroxy-butyramido)-diphenyl amine

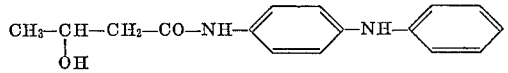

2.1 g. (0.0555 mol) of sodium borohydride were added portionwise to a solution of 15 g. (0.0555 mol) of 4-aceto acetyl amino-diphenyl amine in 100 ml. of methanol cooled to 10° C. After the reaction had ended the mixture was heated to 50° C. for about 15 minutes. The solution was concentrated and water added to the residue and the mixture thoroughly triturated, filtered, washed several times with water, dried and recrystallized from alcohol/petroleum ether. The product was obtained in a yield of 11.5 g. with a melting point of 127–128° C.

EXAMPLE 4

3-methoxy-4-aceto acetyl amino-diphenyl amine

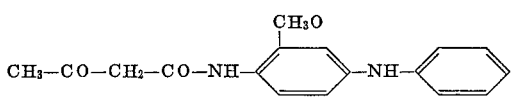

15 g. (0.07 mol) of 3-methoxy-4-amino-diphenyl amine were suspended in 100 ml. of ether and 5.9 g. (0.07 mol) of diketene added thereto while stirring. The reaction occurred very soon in that a clear solution resulted with warming from which the reaction product soon crystallized out. The reaction mixture was stirrred for a further hour and the product then filtered off and recrystallized from isopropanol. Its melting point was 124–125° C. and the yield was 16 g.

EXAMPLE 5

4-aceto acetyl amino-diphenyl methane

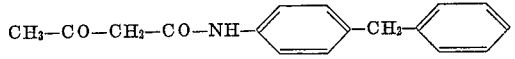

10.5 g. (0.123 mol) of diketene were added to a solution of 22.5 g. (0.123 mol) of 4-amino-diphenyl methane in 70 ml. of dioxane. During the ensuing reaction the temperature rose up to 60° C. After the solution had cooled down again 300 ml. of water were added. The oily product which separated out became solid upon trituration. It was stirred up well with water, filtered off, washed several times with water, dried and recrystallized from a mixture of gasoline (B.P. 100–140° C.) and isopropanol. The product was obtained in a yield of 21.5 g. with a melting point of 88–89° C.

EXAMPLE 6

4-(3-hydroxy-butyramido)-diphenyl methane

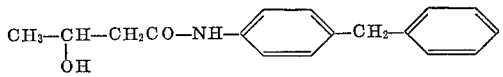

20 g. (0.075 mol) of the product of Example 5 were dissolved in 200 ml. of methanol and 2.9 g. (0.077 mol) of sodium borohydride added to the solution while stirring at 5–10° C. After the reaction ended the reaction mixture was heated for 30 minutes at 50° C. After concentrating the solution and stirring up the syrupy residue with water a crystalline substance was obtained. This was stirred up again with water, filtered off, washed with water and recrystallized from alcohol/water. The product was obtained in a yield of 17.2 g. with a melting point of 110–111° C.

EXAMPLE 7

2-phenyl amino-5-(3-oxo-2-butyl-butyramino)-pyridine

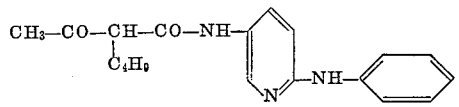

A solution of 1.2 g. of sodium (0.057 mol) in 50 ml. of alcohol was added to a solution of 14 g. (0.057 mol) of 2-phenyl-5-aceto-acetyl amino-pyridine. The mixture was heated under reflux for 2 hours and thereafter 8.2 g. (0.06 mol) of butyl bromide added thereto. The reaction mixture then was again heated under reflux for 8 hours, concentrated, the residue stirred up with water and filtered off. The product after recrystallization from alcohol/water had a melting point of 146–147° C. The yield was 7 g.

EXAMPLE 8

4-(3-oxo-2-butyl-butyramino)-diphenylamine

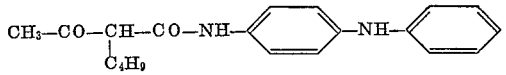

1.7 g. (0.074 mol) of sodium were dissolved in 100 ml. of alcohol and 20 g. (0.0745 mol) of 4-aceto acetyl amino-diphenyl amine added to such solution. After the mixture was heated under reflux for 30 minutes, 10.3 g. (0.075 mol) of butyl bromide were added and the mixture heated under reflux for a further 8 hours. The product which crystallized out upon standing over night was filtered off, stirred up with water, filtered off again and recrystallized from alcohol/water. Its melting point was 142–143° C. and the yield 10 g.

EXAMPLE 9

2-(4-methyl-anilino)-5-aceto acetyl amino-pyridine

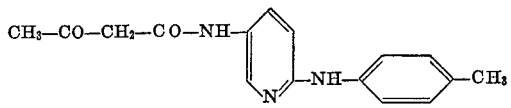

30 g. (0.15 mol) of 2-(4-methyl-anilino)-5-amino-pyridine, 12.6 g. (0.15 mol) of diketene and 300 ml. of acetone were mixed together. After about 10 minutes the mixture heated up to 40° C. After 16 hours, 300 ml. of water were added to the reaction mixture whereupon the end product crystallized out. It was filtered off and washed with water and isopropanol and then recrystallized twice from isopropanol. It had a melting point of 156–157° C. and the yield was 20 g.

EXAMPLE 10

2-(2-methoxy anilino)-5-aceto acetyl amino-pyridine

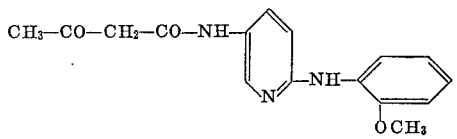

17 g. (0.079 mol) of 2-(2-methoxy anilino)-5-amino-pyridine were dissolved in 100 ml. of benzene and 8 g. of diketene (content of diketene about 84%) added portionwise thereto while stirring at 20–25° C. After the addition was completed the mixture was heated to 50° C. for 30 minutes. After the reaction mixture had cooled down to room temperature, gasoline was added until the solution just began to cloud. The compound soon crystallized out and was filtered off and washed with ether. It was then dissolved in 100 ml. of hot isopropanol and filtered hot. After it had cooled somewhat 100 ml. of gasoline were added. The solution was stored in a refrigerator and the product which crystallized out filtered off, washed with 50 ml. of 1:1 isopropanol/gasoline and dried. The yield was 13.4 g. or about 57% of theory. Its melting point was 81–82° C.

The following compounds were prepared analogously:

(a) 2-(2-ethoxy anilino)-5-aceto acetyl amino-pyridine

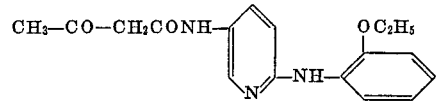

The yield was 51% of theory and its melting point was 117–118° C.

(b) 2-(4-ethoxy anilino)-5-aceto acetyl amino-pyridine

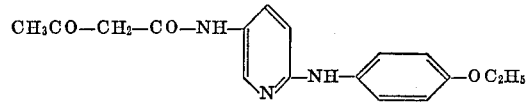

The yield was 68% of theory and after recrystallization from methanol its melting point was 152–153° C.

(c) 2-(3-trifluoromethylamino)-5-aceto acetyl amino-pyridine

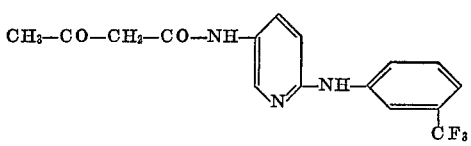

The yield was 51% of theory. After recrystallization from isopropanol its melting point was 127–128° C.

EXAMPLE 11

4-(d,l-β-acetoxy-butyramino)-diphenyl amine

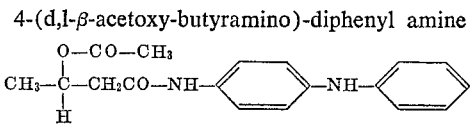

A solution of 18.8 g. (0.12 mol) of d,l-β-acetoxy butyric acid chloride in 50 ml. of benzene was gradually added while stirring to a solution of 21.1 g. (0.115 mol) of p-aminodiphenylamine in 100 ml. of benzene and 16.5 ml. of triethylamine at about 20° C. After the addition was completed the reaction mixture was stirred for a further 30 minutes at 50° C. After cooling, water and ether were added and the mixture thoroughly shaken. The organic phase was separated off, dried and concentrated. The syrupy residue solidified upon standing and was twice recrystallized from isopropanol/petroleum ether. The yield of the product was 19 g. or about 53% of theory and its melting point was 138–139° C.

EXAMPLE 12

4-(d,l-β-hydroxy-butyramino)-diphenyl amine 0.5 g. of 85% powdered caustic soda (0.76 mol) was dissolved in 50 ml. of 10% alcohol. After the addition of 2 g. of the product of Example 11 the reaction mixture was heated under weak refluxing conditions for about 2 hours. The solution was then evaporated to dryness and the residue triturated with water, filtered and dried. The product was recrystallized twice from isopropanol/petroleum ether. The yield was 0.75 g. or about 43% of theory and its melting point was 126–127° C.

EXAMPLE 13

2-(2,5-dimethoxy anilino)-5-aceto acetyl amino-pyridine 25 g. (0.102 mol) of 2-(2,5-dimethoxy anilino)-5-amino pyridine were dissolved in 150 ml. of acetone. Then 10 g. of 84% diketene (0.102 mol) were added gradually while stirring. After the addition was complete the mixture was stirred for a further hour at 50° C. The solution was concentrated and the residue mixed with water and the mixture shaken out with ethyl acetate. The organic phase was separated off, dried with potash, filtered and concentrated. The residue was dissolved in hot isopropanol. Upon cooling a dark viscous oil first separated out from the solution. The clear solution was poured off therefrom. The product recrystallized out from the solution and the crystallization was completed by allowing the mixture to stand overnight in a refrigerator. The crystallized product was filtered off and dissolved in 70 ml. of alcohol. The solution was heated hot with charcoal and filtered. After addition of 50 ml. of gasoline the product crystallized out again. It was filtered off, washed with ether and dried. The melting point thereof was 103–104° C. and the yield 10.5 g.

EXAMPLE 14

2-(2-ethoxy anilino)-5-(β-hydroxy-butyramino)-pyridine

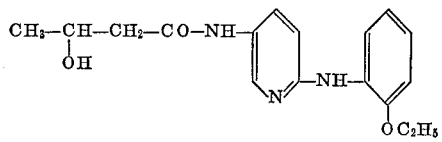

30 g. (0.096 mol) of 2-(2-ethoxy anilino)-5-aceto acetyl amino-pyridine were dissolved in 200 ml. of methanol. 3.64 g. (0.096 mol) of powdered sodium borohydride were added portionwise to the solution while stirring and while cooling the solution to maintain a temperature between +5° C. and +10° C. After the addition was completed the cooling bath was removed and after about 2 hours' standing the solution was concentrated and water added to the syrupy residue and the mixture allowed to stand for several hours. When no crystallization occurred even after such standing, the water was decanted off as much as possible and the residue dissolved in alcohol, the alcohol solution dried with potash, filtered and concentrated. 28 g. of the product were obtained. The maleic acid salt was prepared therefrom in alcoholic solution. Such salt was recrystallized from alcohol/ether. The yield was 30 g. or about 72.5% of theory. Its melting point was 138–139° C.

EXAMPLE 15

2-(4-ethoxy anilino)-5-(β-hydroxy-butyramino)-pyridine 31.3 g. (0.1 mol) of 2-(4-ethoxy anilino)-5-aceto acetyl amino-pyridine were dissolved in 400 ml. of methanol. 3.8 g. (0.1 mol) of sodium borohydride were added portionwise while stirring at room temperature. After the addition was completed the mixture was stirred for a further hour. The mixture was then concentrated and the crystallized residue placed on a filter and washed with water and with isopropanol. The crude product was recrystallized from isopropanol. The melting point of the product was 151–152° C. and the yield 16 g. or about 51% of theory.

EXAMPLE 16

2-(3-trifluoromethyl anilino)-5-(β-hydroxy-butyramino)-pyridine 16.5 g. (0.05 mol) of 2-(3-trifluoromethyl anilino)-5-aceto acetyl amino-pyridine were dissolved in 100 ml. of methanol. 2.1 g. (0.055 mol) of powdered sodium borohydride were added portionwise while stirring at room temperature and the mixture stirred thereafter for 1 hour. The solution was concentrated and water added to the crystalline residue and the mixture filtered. The resulting product was recrystallized from isopropanol with addition of water. The melting point of the product was 141–142° C. and the yield 10.5 g. or 66% of theory.

EXAMPLE 17

2-(4-ethyl anilino)-5-(β-hydroxy butyramino)-pyridine 15 g. (0.055 mol) of 2-(4-ethyl anilino)-5-aceto acetyl amino-pyridine were dissolved in a mixture of 50 ml. of dioxane and 100 ml. of methanol. 2 g. (0.052 mol) of powdered sodium borohydride were added portionwise while stirring at 10° C. and thereafter the mixture stirred for a further 2 hours at room temperature. The solution was concentrated and water added to the syrupy residue. Upon crystallization the mixture was thoroughly stirred and the crystals filtered off, washed with water and dried. 15 g. of the dry substance were dissolved in isopropanol and the solution filtered. 200 ml. of gasoline were added to the filtered solution and the mixture stored over night in a refrigerator. The crystals which separated out were filtered off, washed with ether and dried. The melting point of the product was 118–119° C. and the yield 11 g.

EXAMPLE 18

Analogously to Example 9, 4-methyl-4'-acetoacetyl-aminodiphenylamine was obtained from 4-methyl-4'-aminodiphenylamine and diketene. Upon recrystallization from isopropanol the compound had a melting point of 115–116° C.

EXAMPLE 19

Analogously to Example 9, 4-methoxy-4'-acetoacetyl-amino-diphenylamine was obtained from 4-methoxy-4'-aminodiphenylamine and diketene. Upon recrystallization from isopropanol the compound had a melting point of 128–130° C.

EXAMPLE 20

Analogously to Example 2, 4-methyl-4'-(3-hydroxy-butyryl)-amino-diphenylamine was obtained from 4-methyl-4'-acetoacetylamino-diphenylamine by reduction

EXAMPLE 21

Analogously to Example 20, 4-methoxy-4'-(3-hydroxy-butyryl)-amino-diphenylamine was obtained from 4-methoxy-4'-acetoacetylamino-diphenylamine by reduction with sodium borohydride. Upon recrystallization from isopropanol the compound had a melting point of 132–133° C.

EXAMPLE 22

4-(β-hydroxy-butyramino)-4'-amino-diphenyl-amino

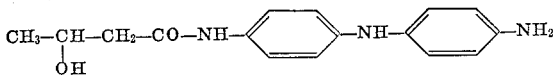

This compound is produced by catalytic reduction of 4 - (β - hydroxy - butyramino) - 4'-nitro-diphenyl-amino. Yield: approximately 86 percent of the theoretical value; F.P.: 144 to 145° C.

EXAMPLE 23

4-acetoacetyl-amino-4'-nitro-diphenyl-amino

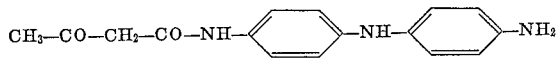

24 gm. (0.105 mole) of 4-amino-4'-nitro-diphenyl-amine are suspended in 200 ml. of dioxane. After adding approximately 0.5 ml. of triethyl amine and 10.5 (0.105 mole) of diketene the reaction temperature increases to 40° C. within 20 minutes and a clear solution forms. The solution is heated for 2 hours to 60° C. It is then mixed with water and a dark oil is separated which becomes solid after some time. The product is filtered with suction, washed with water and after boiling with methanol it is recrystallized from isopropanol. Yield: 8.3 gm., F.P.: 192 to 193° C.

EXAMPLE 24

4-(β-hydroxy-butyramino)-4'-nitro-diphenyl-amine

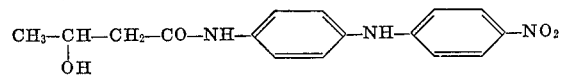

The compound is produced from 4-acetoacetyl-amine-4'-nitro-diphenyl-amine by reduction with sodium borate in the usual manner. The yield is approximately 60 percent of the theoretical value. The melting point is 165 to 167° C.

In addition to the compounds set forth supra, there also are included, for example, the following compounds within the invention 4-(3-oxo-2-methyl-butyramino)-diphenyl amine;
3-(3-oxo-2-ethyl-butyramino)phenyl 2',5'dimethylphenyl amine;
3-butoxy-4-(3-hydroxybutyramido) diphenyl amine,
2-chloro-4-acetoacetyl aminodiphenyl amine,
3-bromo-4-acetoacetyl amino diphenyl amine;
3-trifluoromethyl-4-acetoacetyl aminodiphenyl amine;
4-[2-fluoro-(3-hydroxybutyramido)]-diphenyl amine;
2-methyl-4-acetoacetylaminodiphenyl amine;
2-methyl-4-acetoacetylamino-3'-butyl diphenylamine having the formula

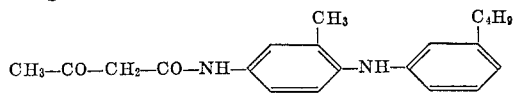

2-butyl-4-acetoacetylamino-3'-methyl 4'-butyl diphenyl methane;
3-propoxy-4-acetoacetylamino-diphenyl amine;
4-acetoacetylamino-4'-chlorodiphenyl amine,
4-(3-hydroxybutyramido)-4'-bromodiphenyl methane;
4-(3-hydroxybutyramido)-4'-trifluoromethyl diphenyl amine;
4-acetoacetylamino-2',4'-dichlorodiphenyl amine;
4-acetoacetylamino-2',3'-di(trifluoromethyl) diphenyl methane;
4-acetoacetylamino-2'-methyl-4'-butoxy diphenyl amine;
4-(3-hydroxybutyramido)-3'-aminodiphenyl amine;
4-(3-hydroxybutyramido)-4'-methylamino diphenyl methane;
4-acetoacetylamino-2'-butylamino diphenyl amine;
4-acetoacetylamino-4'-hydroxy diphenyl amine;
4-(3-hydroxybutyramido)-2',4'-dihydroxy diphenyl amine;
4-(β-butyroxy-butyramino)-diphenyl amine;
4-(β-valeroxy-butyramino)-diphenyl methane;
4-(β-carbonatoethylbutyramino)-diphenyl amine;
4-(β-carbonatomethyl-butyramino)-diphenyl methane having the formula

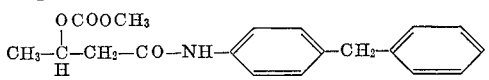

4-acetoacetylamino 3'-nitro diphenylamine;
4-acetoacetylamino-3'-nitro-4'-hydroxy diphenyl amine;
4-acetoacetylamino-4'-acetoxydiphenyl amine;
4-acetoacetylamino-4'-butyramino diphenyl amine.

The term lower alkyl as is understood in the art has 1 to 6 carbon atoms.

In the work reported below using compounds from the examples where Z is

the conditions employed were as follows. The antiphlogistic (antiinflammatory) action was tested partially on albumen edema, partially on carrageenin edema of the rat paw using the procedure of Domenjoz et al., Arch. exp. Pharm. Path. 230, 325, (1957) (albumen edema) and the procedure of Winter et al. J. Pharmacol. exp. Therap. 141, 319, (1963) (carrageenin edema)

The testing for acute toxicity on mice was carried out orally according to the method of Miller and Tainter, Proc. Sec. Exp. Biol. Med. 57, 261, (1944) with an observation time of 24 hours. For each substance about 80 animals were tested.

The analgesic action was ascertained by the mouse tail test according to Haffner, Deutsche Med. Wochenschrift 55, 731, (1929).

The results are given in the following table:

| | Table antiphlogistic action (edema reduction) in percent | | Analgesic action, percent action at 800 mg./kg., orally | $LD_{50}$ mouse (orally) mg./kg. |
|---|---|---|---|---|
| | Carrageenin edema at 30 mg./kg., orally | Albumen edema at 300 mg./kg., orally | | |
| Compound of Example: | | | | |
| 8 | | 31 | None | >4,000 |
| 4 | 25 | 46 | None | >4,000 |
| 5 | 34 | 67 | [1] 570±37 | 1,680±120 |
| 18 | 58 | | 20 | [1] 900±128 |
| 19 | 35 | | None | 800–1,600 |
| 23 | 29 | | None | >4,000 |
| Phenyl butazone standard | 50 | 70 | None | [2] 600–200 |

[1] $ED_{50}$=dosage at which 50% of the mice tested did not react to the pain irritant.
[2] $LD_{50}$ rats orally.

As can be seen from the table in regard to carrageenin edema the compound of Example 18 is about as strongly effective in antiphlogistic activity as phenylbutazone but it is about 4.5 times less toxic to rats. This means that the compound of Example 18 at equal effectivenes possesses a 4 to 5 times better tolerance than phenylbutazone.

The compound of Example 5 is about half as effective as phenylbutazone but it is, however, nearly 3 times less toxic so that in regard to antiphlogistic action and toxicity the antiphlogistic action of the compound of Example 5 clearly is superior to phenylbutazone. Analogous results can be seen with the other compounds in the table.

The claimed compounds are useful as therapeutics in the following illnesses.

Chronic polyarthritis
Illnesses of the rheumatic groups
Post traumatic inflammation
Swellings in fractures
Thrombophlebitis in any form (also post operative)
Bursitis
Synovitis
Collagenoses (polymyositis) pericarteriitis
Gout The compounds can be administered enterally, for example in the form of tablets, capsules, pills, dragées, suppositories, oils and aqueous solutions, suspensions and emulsions. Also they can be administered parenterally, for example as injectable aqueous or oily solutions or suspensions.

In oral administration to animals the claimed compounds have good antiphlogistic activity for example in the range of 10–1000 mg./kg. When employed, for example intravenously they are effective at 1–100 mg./kg. e.g. 10 mg./kg. They can be used with mammals such as dogs, cats, cattle, humans.

Based on animal tests the entrapolated dosage of the claimed compounds permitted with humans for oral application is between about 25 and 5000 mg./per human/per day.

In parenteral administration, for example, intramuscularly the dosage is about 5–1000 mg./per human/per day.

The acute toxicity of the claimed compounds in mice is between 100 and over 4000 mg./kg. orally and as set forth previously with the specific compounds disclosed is over 700 mg./kg.

EXAMPLES OF PHARMACEUTICAL PREPARATIONS

With the use of the customary pharmaceutical assistants the active materials of the invention are processed by known methods to the desired form of administration such as tablets, capsules, dragées, suppositories, suspensions, salves, or solution, for oral, parenteral or local application and the like.

Since the compounds are relatively difficulty soluble in water these are employed in a given case to obtain the necessary concentration of active material organic solvents or agents alone or in admixture with each other or with water. As physiologically compatible organic solvents or agents there can be used among others mono and polyhedric alcohols, e.g. ethyl alcohol, propyl alcohol, ethylene glycol, propylene glycol, glycerine, sorbitol and polyglycols, e.g. diethylene glycol, polyethylene glycol 400, dipropylene glycol, triethylene glycol and their derivatives, e.g. ethylene glycol monomethyl ether, ethylene glycol monoethyl ether, diethylene glycol monoethyl ether and diethylene glycol monomethyl ether, dimethyl sulfoxide, etc.

There are added if necessary to the medicinal preparations preservatives such as sorbic acid, p-hydroxybenzoic acid esters and the like.

On the assumption that no chemical and physiological incompatibility exists there can be added to the medicinal preparations containing the materials of the invention other active materials such as, for example, spasm dissolving, pain alleviating agents, etc.

The following examples illustrate several typical compositions and processes for their preparation and do not describe all of the forms of preparation:

Example A 10.0 grams of the compound of Example 4 were dissolved in 1000 ml. of polyethylene glycol 400 with slight heating. The solution was made up to 2000 ml. with water for injection, passed through a sterilization filter and filled into 2 ml. glass ampoules in known manner. The production of the injection solution can take place under sterile precautions. Likewise it is possible to work under normal conditions and subject the filled ampoules to a heat sterilization.

1 ampoule of 2 ml. capacity contains 10 mg. of 3-methoxy-4-acetoacetylamino-diphenylamine and serves as a single dose.

Example B 20 grams of the compound of Example 5 were dissolved with slight heating in 1000 ml. of polyethylene glycol 400. In the same manner as in Example A these were produced in 2 ml. ampoules containing 10 mg. of 4-acetoacetylamino-diphenyl methane.

Example C 1.0 grams of 4-(3-oxo-2-butyl-butyramino)-diphenyl amine (prepared in Example 8) was dissolved in a mixture of 600 ml. of 1,2-propylene glycol and 100 ml. of ethanol with slight heating and the solution made up to 1000 ml. with water. Ampoules containing 1 ml. of this solution were made up as in Example 1.

Example D 50.0 grams of the compound of Example 18 were worked into 1950 grams of melted suppository base (for example hard fat DAB 7 which is a mixed glyceride) and in known manner poured in the form of 2.0 grams suppositories. Each suppository contained 50 mg. of 4-acetoacetylamino-4'-methyl-diphenyl amine.

Example E 10.0 grams of the compound of Example 19 were granulated in known manner with 10.0 grams of microcrystalline cellulose and 124.5 grams of lactose with about 50 ml. of a 10% starch glue. The dry granulate which passed through an about 1 mm. mesh width sieve was mixed with 40.0 grams of cornstarch, 20.0 grams of talc, 10.0 grams of microcrystalline cellulose and 0.5 gram of highly dispersed silica gel and pressed in known manner to tablets having a weight of 220 mg. and a diameter of 9 mm.

1 tablet contained 10 mg. of 4-acetoacetylamino-4'-methoxydiphenyl amine.

Example F 10 grams of the compound of Example 19 were dissolved in 90 ml. of dimethyl sulfoxide and made up to 100 ml. with water. The 10% active material solution served for local application, e.g. to the skin.

Example G 500.0 grams of the compond of Example 4 were granulated with about 250 ml. of ethanol (96% weight/volume) after drying passed through a sieve having a mesh width of 0.5 mm. and filled into individual dosage of 250 mg. in gelatin stick capsules, size 00. As a single dosage these can be taken orally 1–2 capsules, corresponding to 250–500 mg. of active material.

What is claimed is:

1. A method of producing an antiinflammatory effect in a mammal selected from the group consisting of humans, dogs, cats and cattle comprising administering to said mammal a sufficient dosage to produce such effect of a compound having the formula

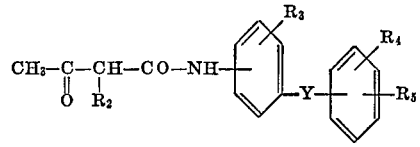

where $R_2$ is hydrogen or alkyl of 1–6 carbon atoms, $R_3$ is hydrogen, methyl, methoxy, propoxy, chloro, bromo or trifluoromethyl, $R_4$ and $R_5$ are hydrogen, hydroxy, alkyl of 1 to 6 carbon atoms, methoxy, butoxy, acetoxy, nitro, chloro or trifluoromethyl, Y is $CH_2$ or NH and when Y is NH at least one of $R_2$, $R_3$, $R_4$ and $R_5$ is other than hydrogen.

2. The method of claim 1 wherein $R_5$ is hydrogen.

3. The method of claim 2 wherein the dosage is between 5 and 5000 mg. per day of active material and the mammal is human.

4. The method of claim 2 where Y is —NH—.

5. The method of claim 2 where Y is —$CH_2$—.

6. The method of claim 1 wherein the

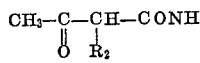

group is in the 4' position.

7. The method of claim 1 wherein the compound is 3-methoxy-4-aceto acetyl amino-diphenyl amine.

8. The method of claim 1 wherein the compound is 4-aceto acetyl amino-diphenyl methane.

9. The method of claim 1 wherein the compound is 4-(3-oxo-2-butyl-butyramino)-diphenyl amine.

10. The method of claim 1 wherein the compound is 4-methyl-4'-aceto-acetylamino-diphenyl amine.

11. The method of claim 1 wherein the compound is 4-methoxy-4'-aceto-acetylamino-diphenyl amine.

12. The method of claim 1 wherein the compound is 4-acetoacetyl-amino-4'-nitro-diphenyl amine.

13. The method of claim 1 wherein the dosage is between 5 and 5000 mg. per day of the compound.

14. The method of claim 13 wherein the administration is orally and the dosage is between 25 and 5000 mg. per day of the compound.

15. The method of claim 13 wherein the administration is parenterally and the dosage is between 5 and 1000 mg. per day of the compound.

References Cited

UNITED STATES PATENTS

| | | | |
|---|---|---|---|
| 3,474,107 | 10/1969 | Thiele | 260—295.5 |
| 3,567,765 | 3/1971 | Thiele | 260—490 |
| 3,377,315 | 4/1968 | Ashton et al. | 260—562 X |

OTHER REFERENCES

Chemical Abstracts 32: 4797[9], 4798[1] (1938).

ALBERT T. MEYERS, Primary Examiner

L. SCHENKMAN, Assistant Examiner

U.S. Cl. X.R.

424—263